United States Patent
Vozner

(10) Patent No.: US 8,285,494 B2
(45) Date of Patent: Oct. 9, 2012

(54) CONVEYOR CHAIN MONITORING SYSTEM AND METHOD

(76) Inventor: Tibor Vozner, North York (CA)

( * ) Notice: Subject to any disclaimer, the term of this patent is extended or adjusted under 35 U.S.C. 154(b) by 402 days.

(21) Appl. No.: 12/582,463

(22) Filed: Oct. 20, 2009

(65) Prior Publication Data

US 2011/0093218 A1   Apr. 21, 2011

(51) Int. Cl.
*G06F 19/00* (2011.01)

(52) U.S. Cl. ............... 702/34; 198/810.01; 198/810.02; 198/810.04; 198/502.1; 198/502.4; 73/828; 73/862.391; 73/862.392; 73/831

(58) Field of Classification Search .................. 702/34; 198/810.04, 502.1, 810.02, 810.01, 502.4; 73/828, 862.391, 862.392, 831, 118.1, 162
See application file for complete search history.

(56) References Cited

U.S. PATENT DOCUMENTS

| | | | | |
|---|---|---|---|---|
| 4,106,005 A * | 8/1978 | Asakawa | ................. | 198/810.02 |
| 5,291,131 A * | 3/1994 | Suzuki et al. | ................. | 324/206 |
| 5,482,154 A * | 1/1996 | Affeldt et al. | ............. | 198/370.04 |
| 5,490,590 A * | 2/1996 | Courtney | ................... | 198/502.4 |
| 5,563,392 A * | 10/1996 | Brown et al. | ................. | 235/91 R |
| 6,851,546 B2 * | 2/2005 | Lodge | ......................... | 198/502.1 |
| 6,862,939 B2 * | 3/2005 | Frost | ............................. | 73/828 |
| 6,865,955 B2 * | 3/2005 | Nassar et al. | ................... | 73/828 |
| 6,991,094 B2 * | 1/2006 | Frost | ............................. | 198/853 |
| 7,540,374 B2 * | 6/2009 | Rathbun et al. | .......... | 198/810.04 |
| 2003/0140709 A1 * | 7/2003 | Frost | ............................. | 73/828 |
| 2004/0226805 A1 * | 11/2004 | Lodge | ...................... | 198/810.02 |
| 2007/0056379 A1 | 3/2007 | Nassar et al. | | |
| 2008/0047804 A1 * | 2/2008 | Rathbun et al. | ............ | 198/502.1 |

FOREIGN PATENT DOCUMENTS

CA    2173656 A1    10/1996
WO    WO 03093783 A1 *  11/2003

* cited by examiner

*Primary Examiner* — Carol Tsai
(74) *Attorney, Agent, or Firm* — Gifford, Krass, Sprinkle, Anderson & Citkowski, P.C.

(57) ABSTRACT

A system for monitoring the wear of a moving conveyor chain includes a first detector for detecting a leading end of a first link of the chain and providing a first signal corresponding thereto, a second detector for detecting a trailing end of the first link and providing a second signal corresponding thereto, and a third detector for detecting a leading end of a third link of the chain and providing a third signal corresponding thereto. The system processes the signal so as to determine a first distance $D_1$ which is the distance between the leading end and trailing end of the first link, a second distance $D_2$ which is the distance between the trailing end of the first link and the leading end of the third link, and a third distance $D_3$ which is the distance between the leading end of the first link and the leading end of the third link. These distance values are compared with corresponding distances which were previously measured or which were selected as benchmarks, and the differences therebetween provide data indicative of state of wear of the chain. The system operates to measure collective wear of the links as well as wear of individual link members.

14 Claims, 2 Drawing Sheets

CONVEYOR CHAIN MONITORING SYSTEM AND METHOD

FIELD OF THE INVENTION

This invention relates generally to chains. More specifically, the invention relates to systems and methods for monitoring wear and/or damage to conveyor chains, lifting chains, drag chains, and the like. Most specifically, the invention relates to a chain monitoring system and method which operates to provide data relating to overall chain wear as well as to individual link damage.

BACKGROUND OF THE INVENTION

Conveyor chains are frequently used for moving workpieces, finished goods, and other materials through processing and handling stations in manufacturing plants, warehouses, and the like. These chains are typically heavy duty assemblies of a plurality of individual links, which in many instances are joined together by pins. Chains are also used in a variety of other industrial applications for lifting, dragging and securing; and, while this invention is described herein with reference to its use for monitoring conveyor chains, it is to be understood that it may likewise be used in connection with other types of chains.

The unexpected failure of a chain can have serious consequences in terms of safety and cost. In addition to harming personnel, failure of a chain can damage goods and equipment. Also, significant costs can occur as a result of the unanticipated downtime. In view of the foregoing, industry typically monitors the integrity and wear state of conveyor, and other, chains on a regular basis. In many instances, mechanical or electromechanical systems, non-destructive testing methods (NDT) and proof loading are used to monitor chain wear. In most instances, these systems operate to measure the length of a preselected section of a chain, since chains will generally elongate as a result of wear of their component links and connecting pins. When a predetermined amount of elongation has occurred, the chain will be taken out of service for replacement or maintenance. Some prior art chain monitoring systems are shown in U.S. Pat. Nos. 7,540,374; 5,291, 131; 5,482,154; 6,851,546; 5,490,590; 5,563,392; and published U.S. Application US 2007/0056379.

Elongation of a chain may, in some instances, be caused by the collective wear of its individual links and/or pins. In other instances, elongation may be caused by the cracking or stretching of one or more individual links. In yet other instances, chain elongation may be a combination of both of the foregoing. One problem with prior art chain monitoring systems is that they operate to provide an indication of overall chain lengthening and do not address the state of individual links, and hence cannot distinguish between lengthening resultant from overall wear and lengthening resultant from individual link failure. As will be explained in detail hereinbelow, the present invention provides a relatively simple chain monitoring system which is capable of providing data indicative of chain lengthening resultant from collective wear as well as from individual link failure.

BRIEF DESCRIPTION OF THE INVENTION

Disclosed is a system for monitoring the wear of a moving chain having at least a first link, a third link, and a second link which couples the first and third links. The system includes a first detector for detecting a leading end of the first link and providing a signal corresponding thereto, a second detector for detecting a trailing end of the first link and providing a second signal corresponding thereto, and a third detector for detecting a leading end of the third link and providing a third signal corresponding thereto. The signals are communicated to a processor which is operative to determine a first distance $D_1$ which is the distance between the leading end and trailing end of the first link, a second distance $D_2$ which is the distance between the trailing end of the first link and the leading end of the third link, and a third distance $D_3$ which is the distance between the leading end of the first link and the leading end of the third link. The values of these distances are compared with previously obtained or determined values, and deviations from said values are indicative of chain wear. In specific instances, the detectors are optical detectors which include a light source which may be a visible or infrared light source, and a light sensor which, in particular instances, is a position-sensitive light sensor such as a charge coupled device. The system may include further detectors which may be utilized in combination with, or instead of the first, second, or third detectors. The system may operate to count the number of chain links which pass therethrough so as to correlate obtained data with chain position. Also, the system may operate to apply an indicator mark onto selected links of the chain. Also disclosed is a method for monitoring chain wear by the use of a system as described above.

DETAILED DESCRIPTION OF THE INVENTION

The present invention is directed to a system for monitoring the wear of a moving chain. The system operates to obtain positional data regarding particular portions of the chain and then processes that data to derive measurements of the distance between the detected portions of the chain. This distance data is compared with prior data to determine the degree to which the chain, as well as particular components of the chain, are elongating. In this manner, overall chain wear resultant from collective wear of the chain components, as well as lengthening resultant from damage to individual links, is determined.

Figure 1:
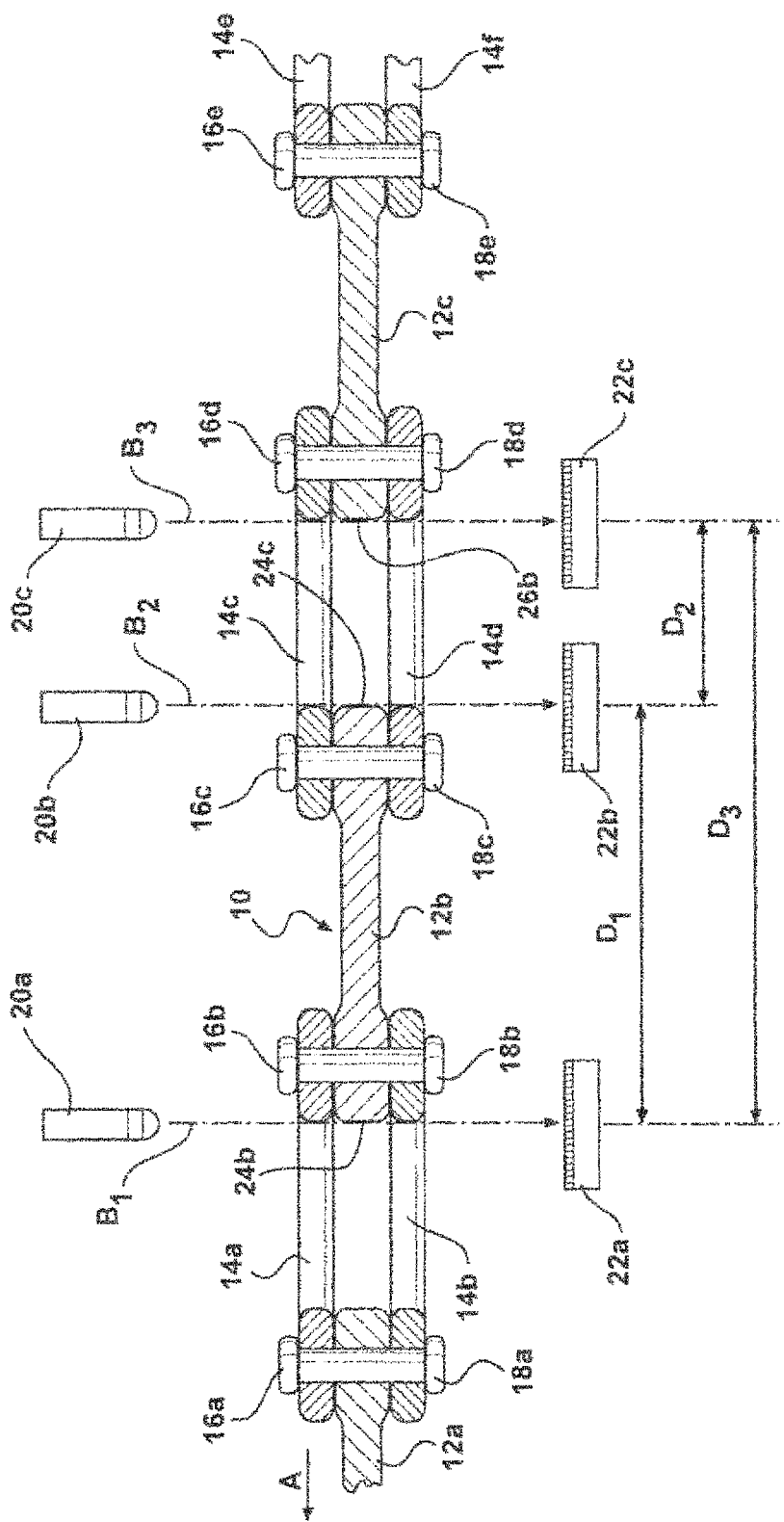
FIG. 1 is a schematic depiction of one implementation of the present invention.

The system of the present invention may be implemented in a variety of configurations, and FIG. 1 depicts one such implementation. As shown in FIG. 1, the system is operative to monitor the state of a conveyor chain 10. As is known in the art, the chain 10 is comprised of a plurality of center links 12a-12c joined together by corresponding pairs of side links 14a-14f. As shown in FIG. 1, the side links are coupled to their respective center links by means of pivot pins 16a-16e retained by associated nuts or cap portions 18a-18e. It is to be understood that other embodiments of chain are known in the art. For example, links may be interconnected directly without the use of the pins. Also, links may be sized or shaped differently from those shown herein. It is to be understood that the present invention may be implemented with all of such chain configurations.

In operation, the chain 10 moves along a path of travel generally shown by the arrow A. The monitoring system of the present invention is disposed at a measuring station along the path of travel of the chain. In the FIG. 1 embodiment, the monitoring system includes a first detector assembly, which in this instance is an optical detector comprised of a light source 20a and a corresponding light sensor 22a. The light source will preferably operate in the visible or infrared portions of the spectrum. The light source 20a is, in this instance, a solid state laser diode; however, it is to be understood that other light sources, including coherent light sources as well as noncoherent light sources, may be employed in the practice of the present invention. Some such light sources include, but are not limited to: light emitting diodes, incandescent lights, discharge lamps, fluorescent lamps, and the like. Also, the light source may include associated lenses, apertures, slits, and the like as is known in the art. In the operation of the invention, the light source 20a projects a beam of light $B_1$ across the path of travel of the chain. The side links 14a, 14b include aperture portions therethrough, and the beam is directed so as to pass through these apertures. As the chain advances along the path of travel A, a leading end of the center link 12b will contact and occlude the beam. As shown in FIG. 1, this leading end 24b is just establishing contact with the beam. The sensor 22a is detecting the beam $B_1$; and when the leading end 24b of the link 12b occludes the beam, the sensor 22a will generate a first signal so indicating.

The system of FIG. 1 includes a second detector assembly which includes a second light source 20b and a second sensor 22b. The light source and sensor may be the same as, or different from, the ones used in the first detector. The light source 20b of the second detector emits a light beam $B_2$ which passes through the path of travel of the chain and strikes the second sensor 22b. The second detector is configured and positioned so that beam $B_2$ will be occluded by the first link 12b; and as is shown in FIG. 1, the second end 26b thereof has just ceased occluding the beam $B_2$ and the sensor 22b is activated so as to generate a second detection signal.

The system of FIG. 1 also has a third detector which includes a light source 20c operative to provide a light beam $B_3$ and project that beam across the path of travel of the chain 10 to an associated sensor 22c. The third detector is configured and positioned so that the leading end 24c of the link 12c will contact and occlude the beam $B_3$. As shown in FIG. 1, the leading end 24c of the link 12c is just about to establish contact with and occlude the beam. As in the first and second detectors, the sensor 22c of the third detector generates a third signal corresponding to the illumination incident thereupon. The signals from the sensors 22a-22c are conveyed to a data processor which, as will be described hereinbelow, processes data to produce signals indicative of the state of the chain.

In the operation of the system of FIG. 1, travel of the chain along the path A will bring the leading end 24b of a first link 12b into contact with the beam $B_1$ thereby occluding this beam and initiating the start of a measurement cycle. In this manner, the signal from the sensor 22a provides a reference point fixing the location of the leading end 24b of the link 12b relative to the measurement system and to the rest of the chain. Upon initiation of the measurement cycle, the second detector notes the relative position of the trailing end 26b of the first link 12b. In this regard, the second beam of light $B_2$ has a finite width, and the sensor 22b is a positional sensor comprising a charge coupled device detector which notes the spatial location of the shadow cast thereupon by the beam $B_2$ striking the trailing end 26b of the link 12b. On the basis of the signal from the first sensor 22a and the signal from the second sensor 22b, the associated processor can readily calculate a first distance $D_1$ corresponding to the length of the first link 12b. Based upon stored calibration data, or previously collected data, the processor can determine if the length of the link 12b ($D_1$) exceeds some predetermined limit. If it does, the system will indicate that link 12b may be in a failure mode.

In the further operation of the system, activation of the first sensor 22a also initiates the operation of the third sensor. In this regard, sensor 22c provides positional data regarding the shadow generated by the beam $B_3$ and leading end of the third link 12c. In this embodiment, the third detector 22c, like the second detector 22b, is a charge coupled device which provides positional data regarding the location of the shadow. In this manner, the system operates to fix the position of the leading end of the third link 12c. The generated data from sensor 22c is processed together with the data from sensor 22b to calculate the distance $D_2$ which indicates the spacing between the trailing end 26b of the first link 12b and the leading end 24c of the third link 12c. Any lengthening of the expected value of $D_2$ could be attributed to damage to one or more of the side links 14c, 14d or to wear at the link pins 16c, 16d. As a practical matter, in chains of this construction, link failure almost always occurs at the center links and not at the side links; therefore, any unexpected lengthening of $D_2$ will generally be regarded as being due to chain wear.

The system of the present invention further operates to calculate the distance $D_3$ which measures the overall length of one chain pitch as running from the leading end 24b of a first link 12d through to the leading end 24c of a third link 12c. This value $D_3$ can be derived by adding $D_1$ and $D_2$, or it may be generated by using data from the photosensor 22a and the photosensor 22c. It will be appreciated that by comparing the values of $D_1$, $D_2$ and $D_3$ with previously derived or selected values, the state of wear of the chain 10 may be readily determined both with regard to collective wear of the component links and pins of the chain as well as with regard to damage or failure of individual link members.

It should be understood that while FIG. 1 shows the system as being disposed so as to measure a single pitch of chain as constituted by center link 12b and associated side links 14c, 14d, the system of the present invention may be configured and disposed so as to take measurements on a longer section of chain. For this reason, it is to be understood that while this disclosure refers to the chain as having first, second and third links, wherein the second link couples the first and third links, this language was chosen to provide reference points for the placement of the sensors and the specification and claims are written with the understanding that still other links may be interposed between the first and third links. In implementations which measure more than one pitch of chain, the third light source 20c and associated sensor 22c may be positioned further down on the length of the chain. In such an embodiment, distance $D_1$ will still measure the length of a particular center link; but distance $D_2$ as well as distance $D_3$ will encompass a number of side and center links. In yet other embodiments, further detectors may be added to the system. For example, the first, second, and third detectors may be positioned as previously described, and a fourth detector may be positioned further down the length of the chain. As will be apparent to those of skill in the art, such embodiments can generate still further data corresponding to distances between selected pairs of the detectors. In systems of this type, the processor may operate to select particular detector configurations. For example, in some instances, conveyor systems having different chain lengths are encountered in different industrial applications, and by the use of a multiple detector embodiment of this type, the system may be readily configured and reconfigured for different geometries of conveyor chain. In yet other instances, chains may be configured so that at least four detectors will be required to monitor the wear of a single chain pitch. All of such embodiments are within the scope of this invention.

In the FIG. 1 embodiment, all of the sensors 22a-22c are described as being charge coupled devices. However, it should be noted that the first sensor 22a need not be capable of providing positional data regarding the leading end 24b of the link 12b. It is sufficient that the first detector provide a spatial reference point indicating when the leading end 24b is in a particular location. Thus, a simple go/no go sensor may be employed. However, as a practical matter, applicant has found that use of a charge coupled device providing precise positional data is satisfactory. Also, while charge coupled devices are described as being used in the invention, other detectors including diode arrays, photo cells and the like may also be employed to provide positional data. Other optical detection systems may include video imaging devices. Furthermore, while optical detection systems are simple and easy to implement, other detection systems may likewise be employed in the practice of the present invention. For example, capacitive sensors, mechanical sensors, magnetic sensors, as well as ultrasonic sensors may be used to provide positional data regarding portions of the chain. All of such embodiments may be implemented in accord with the present invention.

Figure 2:
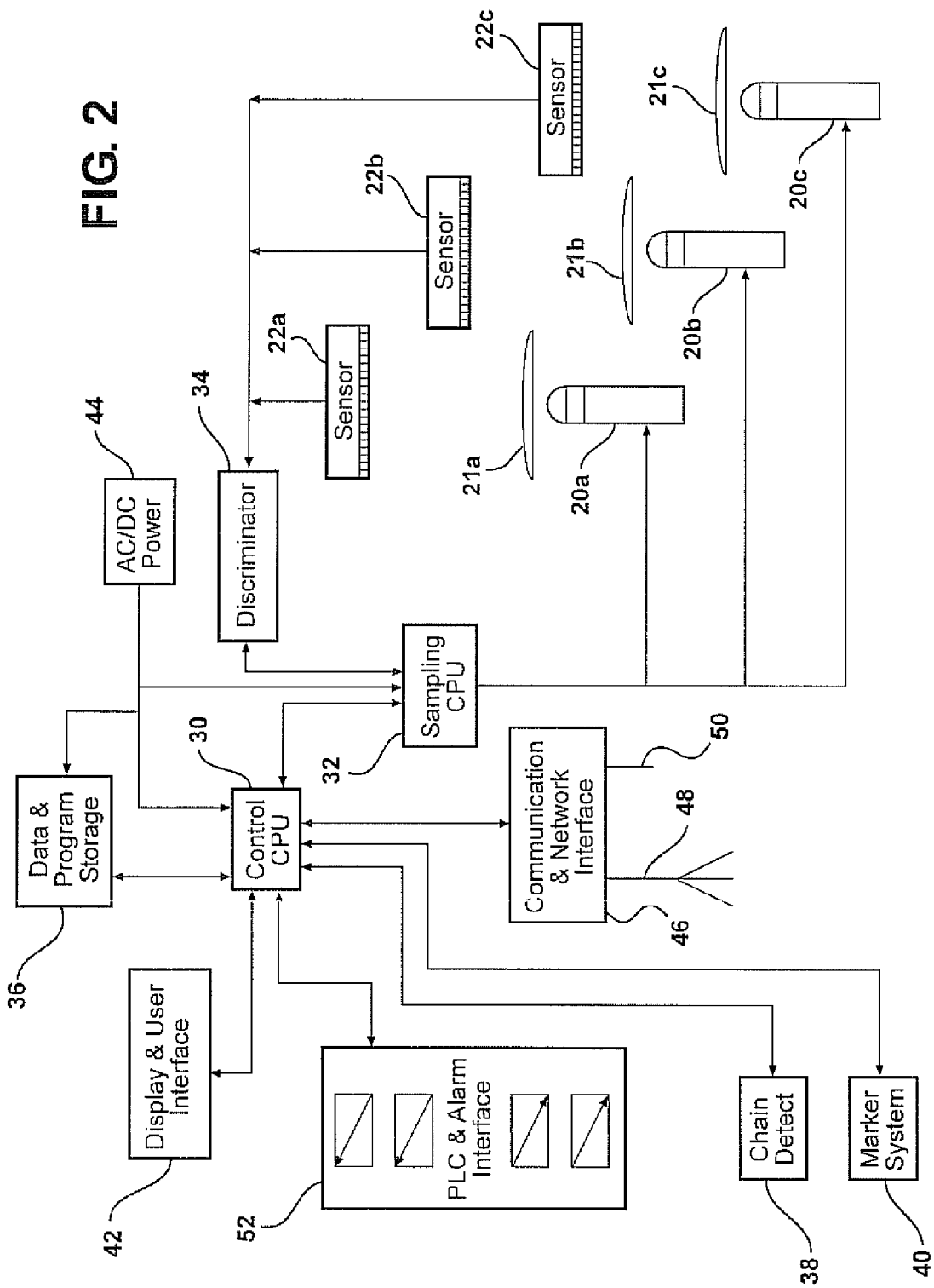
FIG. 2 is a block diagram of one implementation of the present invention.

Referring now to FIG. 2, there is shown a block diagram of one embodiment of the present invention generally similar to that of FIG. 1. As illustrated, the system includes a first detector which is comprised of a first light source 20a which operates, together with a first lens 21a, to project a beam of light across the path of travel of a chain (not shown) through to a first sensor 22a. As described above, the light source 20a is typically a visible or infrared light source, and in particular instances comprises a laser diode; although, as noted above, other light sources may be employed. The sensor 22a in this instance is a charge coupled device, and as noted above, other sensors may be employed. Similarly, a second detector is comprised of a second light source 20b, associated lens 21b, and sensor 22b; and a third detector is comprised of a third light source 20c, associated lens 21c, and associated sensor 22c.

Depending upon the operational mode chosen, the light sources may be operated in a continuous mode or they may be periodically activated. For example, the system may operate to activate the second 20b and third 20c light sources when the first light source 20a and associated sensor 22a note the presence of the chain at a start point. The light sources 20a-20c are under the control of a control CPU 30 via a sampling CPU 32. The signals produced by the sensors 22a-22c are separated and identified as to origin by a discriminator 34 and communicated to the sampling CPU 32 from whence they are conveyed to the control CPU 30.

As discussed above, the control CPU processes the signals from the sensors so as to determine the distances $D_1$-$D_3$ separating the various portions of the selected links of the chain. Associated with and in communication with the control CPU 30 is a block of memory 36 which stores collected data and the operating program. Using this program and stored data, the control CPU 30 can calculate the amount of wear experienced by the chain based upon the measured distances. In addition, the control CPU 30 can then provide a signal indicating the state of wear of the chain with regard to collective wear as well as wear of individual links.

As further shown in FIG. 2, the system includes a chain detect module 38 which operates to detect a marker link the chain as it passes through the monitoring system. This marker link may include a magnet, a visual mark or some other indicator. Since the number of links in a particular conveyor chain are known, the chain detect module 38 can uniquely identify each link and cooperate with the control CPU 30 to correlate generated data with particular links. Additionally, the chain detect module can determine when a full cycle of the conveyor chain has been monitored. In this manner, unique data regarding each link can be stored in the memory block 36. In addition, this data can be correlated so as to count the number of successive passages of the chain through the monitoring system. Thus, historical data for each link indicating wear status as a function of time may be readily generated.

The chain monitor may further include a marker system 40 which is activatable by the control CPU 30. The marker system 40 operates to place an indicating mark, such as a paint spot, a magnetic tag, or the like, onto selected chain links as directed by the control CPU 30. In this manner, chain links identified as being defective may be tagged for inspection. The indicating marks may be human and/or machine readable.

The system will further include a display and user interface 42 which can be a visual display such as an LED or LCD screen. The display may additionally or alternatively comprise an audio signaling device. In addition, the display may include one or more remote signaling devices such as alarm lights, audio signals or the like. The display and user interface may further include a keyboard or other such user input terminal. The system will also include a power source 44 which may be an AC or DC power supply.

The system of FIG. 2 may be further operative to communicate with a remote interface device and in that regard will include a communication and network interface 46 which, as shown, may be operative to communicate via a wireless link 48 or a hardwired link 50. In some instances, the system will include an alarm interface 52 which is in communication with the control CPU 30. This alarm interface can operate to communicate data regarding the state of chain wear to a central control system. For example, the monitoring system of FIG. 2 may be part of a dedicated system used for monitoring a particular chain or a group of chains; and the alarm interface 52 may be used to communicate selected data to a second computer system which operates to monitor and control the overall manufacturing or handling system of which the particular chain is a part. In this regard, the interface 52 may include one or more programmable logic controllers operative to select and direct data as appropriate. The interface 52 may communicate to the second control system via a hardwired link. However, in many instances, and in particular when the monitoring system is being operated by an entity separate from the entity operating the manufacturing system, it may be desirable to isolate the control system of FIG. 2 from the second control system so as to prevent errors, data corruption, or to enhance security. In such instances, connection between the interface 52 and the second computer system may be via an opto-electronically isolated link such as an optical data link.

The control system of FIG. 2 may be implemented in a variety of configurations using various hardware elements known and available to those of skill in the art. For example, the memory devices used therein could be volatile or nonvolatile memory devices, flash memory, or could rely upon nonlocal/network data storage. Interface to a network could be by LAN, intranet, internet, or wireless communication protocol such as WIFI, Bluetooth, or ZigBee. These and other modifications and variations will be readily apparent to those of skill in the art. Also, as noted above, this system is not limited to use in conjunction with conveyor chains. It may be employed to monitor wear in any other chain based system or apparatus.

The foregoing drawings, discussion, and description are illustrative of some specific embodiments of the present invention but are not meant to be limitations upon the practice thereof. It is the following claims which define the scope of the invention.

The invention claimed is:

1. A system for monitoring the wear of a moving conveyor chain having at least a first link, a third link, and a second link which couples the first and the third links, said system comprising:
   a first detector for detecting a leading end of the first link and providing a first signal corresponding thereto;
   a second detector for detecting a trailing end if the first link and providing a second signal corresponding thereto;
   a third detector for detecting a leading end of the third link and providing a third signal corresponding thereto; and
   a processor operative to receive and process said first, second, and third signals so as to determine: a first distance $D_1$ which is the distance between the leading end and trailing end of the first link, a second distance $D_2$ which is the distance between the trailing end of the first link and the leading end of the third link, and a third distance $D_3$ which is the distance between the leading end of the first link and the leading end of the third link, wherein said distances $D_1$, $D_2$, and $D_3$ as measured for said chain are compared with previously determined values of $D_1$, $D_2$, and $D_3$, and deviations from said values are indicative of chain wear.

2. The system of claim 1, wherein at least e of said detectors is an optical detector which comprises a light source disposed so as to project a beam of light across the path of travel of the chain and an optical sensor disposed so as to intercept said beam of light after it has crossed the path of the chain.

3. The system of claim 2, wherein said optical sensor comprises a charge coupled device.

4. The system of claim 2, wherein said light source comprises a solid state laser.

5. The system of claim wherein at least one of said detectors is operable to provide a signal which includes positional data regarding the end of the link which has been detected.

6. The system of claim 1, further including a fourth detector for detecting an end of a link of said chain and providing a fourth signal corresponding thereto.

7. The system of claim 6, wherein said processor is further operable to substitute said fourth signal for one of said first, second, or third signals.

8. The system of claim 1, wherein said processor is further operative to determine the degree of wear of said first link based upon the determined value of $D_1$.

9. The system of claim 1, wherein said processor is further operational to determine the collective wear of said chain based upon the determined values or one or more of $D_1$, $D_2$, and $D_3$.

10. The system of claim 1, wherein said processor is operative to sequentially obtain and store sets of values for $D_1$, $D_2$, and $D_3$, and to determine changes therein as a function of time.

11. system of claim 1, further including a chain marker which operates to apply an indicator mark on a selected link in response to a control signal generated by said processor.

12. The system of claim 1, further including a chain detector which is operable to count the number of chain links which have passed through said system.

13. The system of claim 1, further including a chain detector which is operable to count the number of passages the chain has made through said system.

14. A method for monitoring the wear of a moving conveyor chain, said method comprising, the steps of:
   providing a first, a second, and a third detector, each detector being operative, to detect a portion of a link of a conveyor chain and generate a signal corresponding thereto;
   disposing said first detector in the path of said moving conveyor chain so as to detect a leading end of a first chain link and provide a first signal;
   disposing said second detector in the path of said moving chain so as to detect a trailing end of the first link and generate a second signal;
   disposing said third detector in the path of said moving chain so as to detect a leading end of a third link of said moving chain so as to detect a leading end of a third chain link and provide a third signal;
   processing said first, second, and third signals so as to determine, a first distance $D_1$ which is the distance between the leading end and the trailing end of the first link, a second distance $D_2$ which is the distance between the trailing end of the first link and the leading end of the first link, and a third distance $D_3$ which is the distance between the leading end of the first link and the leading end of the third link, wherein said distances $D_1$, $D_2$, and $D_3$ as measured for said chain are compared with previously determined values of $D_1$, $D_2$, and $D_3$, and deviations from said values are indicative of chain wear.

* * * * *

UNITED STATES PATENT AND TRADEMARK OFFICE
CERTIFICATE OF CORRECTION

PATENT NO. : 8,285,494 B2　　　　　　　　　　　　　　　　　　　　　　　Page 1 of 1
APPLICATION NO. : 12/582463
DATED : October 9, 2012
INVENTOR(S) : Tibor Vozner It is certified that error appears in the above-identified patent and that said Letters Patent is hereby corrected as shown below:

In the Claims:

At column 7, claim number 5, line number 36, after "claim" insert --1--.

At column 8, claim number 14, line number 41, delete "$_{D2}$" and insert --$D_2$--.

At column 8, claim number 14, line number 43, delete "$_{D2}$" and insert --$D_2$--.

Signed and Sealed this
First Day of March, 2016

Michelle K. Lee
*Director of the United States Patent and Trademark Office*